Patented Aug. 26, 1930

1,774,018

UNITED STATES PATENT OFFICE

GEORG KRÄNZLEIN AND ARTHUR VOSS, OF HOCHST-ON-THE-MAIN, GERMANY, ASSIGNORS TO GENERAL ANILINE WORKS, INC., OF NEW YORK, N. Y., A CORPORATION OF DELAWARE

PROCESS FOR THE PREPARATION OF MAGNESIUM BICHROMATE

No Drawing. Application filed May 10, 1927, Serial No. 190,377, and in Germany June 22, 1925.

This invention relates to the preparation of magnesium bichromates. This application contains subject matter in common with our application Serial No. 113,552, filed June 3, 1926, which has issued as Patent No. 1,632,299 dated June 14, 1927.

Heretofore no commercial process for the preparation of magnesium chromates has been discovered. Their preparation from magnesium and chromic acid (Dammer Vol. III, page 580) cannot be considered as such, and even less, the preparation of double salts such as $K_2CrO_4.MgCrO_4$ or $MgCrO_4.MgSO_4$ (Dammer Vol. III, page 580 and Gmelin Kraut Vol. III, part 1, page 694).

We have discovered that in the double decomposition of magnesium salts with alkali metal or alkaline earth metal chromates, the formation of double salts can be prevented if magnesium salts of such acids are chosen for double decomposition as form salts with the alkali metals or the alkaline earth metals which are more difficultly soluble in water than magnesium chromates. The double decomposition is carried out in such a way that both salts react with each other in the presence of water. The reaction conditions are so chosen that the more difficultly soluble alkali metal or alkaline earth metal salt, as the case may be, separates out while the magnesium chromate remains in solution. In the case of alkaline earth chromates, these conditions are satisfied by treating their aqueous solutions with aqueous solutions of magnesium sulphate at a boiling temperature. In the case of alkali metal chromates, the double decomposition reaction of the aqueous solutions of the two components is carried out in a partial vacuum at the lowest possible temperature. First, the greater part of the alkali metal salt is precipitated, and then the magnesium chromate separates out. Therefore the precipitated salt is first filtered off and then the solution is further evaporated until all of the magnesium chromate separates out. The concentrated solutions of the magnesium chromate may be utilized directly without evaporation for many purposes.

The process of this invention is very important commercially since the magnesium chromate which is produced possesses a large number of advantages over the chromates heretofore known. Among other advantages, the magnesium chromate produced by this invention possesses that of very great solubility and an advantage which is very important in oxidation processes of organic chemistry, in that on reduction it produces salts which are very soluble. Another advantage is the cheapness of the magnesium salt as compared with alkali metal salts.

This invention is illustrated by the following examples:

(1) A concentrated solution of 60 parts by weight of sodium bichromate is mixed with a saturated solution of 50 parts of crystalline magnesium chloride and the solution is evaporated in a vacuum at a temperature which is not allowed to go above 40° C. After most of the sodium chloride has separated out, the mixture is filtered while warm on a suction filter which has previously been warmed. The filtrate solidifies in the cold to a paste of magnesium bichromate crystals.

Of course, the process can also be carried out in such a way that magnesium bichromate and sodium bichromate are produced at the same time. One method of carrying out this process commercially is by mixing sodium chromate with the required amount of sulphuric acid and magnesium sulphate, carrying out the double decomposition in the warmth, separating the solution of magnesium bichromate from the precipitated sodium sulphate by suction filtering after the mixture has cooled, and then subsequently washing the paste of sodium sulphate crystals with a small amount of concentrated magnesium sulphate solution.

It is not necessary to exercise as much care to keep the temperatures low in the case of the double decomposition of alkali metal bichromates with magnesium salts as in the case of the preparation of neutral chromates, because in the former case the tendency for double salts to form is not as great.

In the appended claims by the term "alkali-forming metal" we mean a metal of the alkali or alkaline earth groups.

(2) An aqueous solution of calcium bichromate is produced by dissolving 156 parts by weight of calcium chromate in 700 parts of boiling water, running 100 parts by weight of sulfuric acid of 50% strength into the hot solution so obtained, while stirring, completing the reaction by boiling for a short time, and finally filtering off the calcium sulfate which has separated. The solution so prepared is mixed with a solution of 150 parts by weight of anhydrous magnesium sulfate in 500 parts of water, the resulting mixture is stirred for ten–fifteen minutes at 80–90° C. and the calcium sulfate, which has separated, is filtered by suction. By evaporating the solution of magnesium bichromate, preferably in a vacuum, a highly concentrated solution (of about 60–70% strength) can be produced, which has next to no tendency to crystallize. By further evaporating, especially by subsequently cooling strongly the concentrated solution, a crystalline magma consisting of magnesium bichromate is obtained. The latter may be isolated by filtering with suction and drying in a vacuum; it shows, however, the tendency to deliquesce again.

We claim:

1. A process of preparing magnesium bichromate which comprises reacting a bichromate of an alkali-forming metal with a magnesium salt of an acid which forms with an alkali-forming metal a salt which is less soluble in water than the magnesium bichromate.

2. A process of preparing magnesium bichromate which comprises reacting in the presence of water a bichromate of an alkali-forming metal with a magnesium salt of an acid which forms with an alkali-forming metal a salt which is less soluble in water than the magnesium bichromate.

3. A process of preparing magnesium bichromate which comprises reacting a bichromate of an alkali metal with a magnesium salt of an acid which forms with an alkali metal a salt which is less soluble in water than the magnesium bichromate.

4. A process of preparing magnesium bichromate which comprises reacting sodium bichromate and magnesium chloride in aqueous solution and separating the sodium chloride so formed from the reaction mixture.

5. A process of preparing magnesium bichromate which comprises reacting in the presence of water a bichromate of an alkali-forming metal with a magnesium salt of an acid which forms with an alkali-forming metal a salt which is less soluble in water than the magnesium bichromate under such temperature and pressure conditions that the salt of the alkali-forming metal separates out while the magnesium bichromate remains in solution, and separating the salt of the alkali-forming metal from the reaction mixture.

6. A process of preparing magnesium bichromate which comprises reacting at a low temperature under reduced pressure in the presence of water a bichromate of an alkali metal with a magnesium salt of an acid which forms with an alkali metal a salt which is less soluble in water than magnesium bichromate, and separating the alkali metal salt from the reaction mixture.

7. A process of preparing magnesium bichromate which comprises reacting in aqueous solution under reduced pressure at a temperature not above 40° C. a bichromate of an alkali metal with a magnesium salt of an acid which forms with an alkali metal a salt which is less soluble in water than magnesium bichromate, and separating the alkali metal salt from the reaction mixture.

In testimony whereof, we affix our signatures.

GEORG KRÄNZLEIN.
ARTHUR VOSS.